(12) United States Patent
Chen et al.

(10) Patent No.: US 6,563,654 B2
(45) Date of Patent: May 13, 2003

(54) EXTERNAL PUPIL LENS SYSTEM

(75) Inventors: Chungte W. Chen, Irvine, CA (US);
Ronald G. Hegg, Vista, CA (US);
William B. King, Rancho Palos Verdes, CA (US)

(73) Assignee: Raytheon Company, Lexington, MA (US)

( * ) Notice: Subject to any disclaimer, the term of this patent is extended or adjusted under 35 U.S.C. 154(b) by 14 days.

(21) Appl. No.: 09/834,580

(22) Filed: Apr. 12, 2001

(65) Prior Publication Data

US 2002/0149856 A1 Oct. 17, 2002

(51) Int. Cl.[7] .............................. G02B 9/04; G02B 5/18
(52) U.S. Cl. ....................................... 359/793; 359/570
(58) Field of Search ............................ 359/570, 574, 359/575, 576, 793, 794, 795

(56) References Cited

U.S. PATENT DOCUMENTS 5,148,314 A * 9/1992 Chen .......................... 359/642
5,153,772 A 10/1992 Brown et al. ................ 359/364
5,446,588 A 8/1995 Missig et al. ................ 359/565
5,978,145 A 11/1999 Mukai et al. ................ 359/642

FOREIGN PATENT DOCUMENTS

EP 0 517 409 12/1992

* cited by examiner

Primary Examiner—Hung Xuan Dang
Assistant Examiner—David N. Spector
(74) Attorney, Agent, or Firm—Colin M. Raufer; Leonard A. Alkov; Glenn H. Lenzen, Jr.

(57) ABSTRACT

An external pupil lens system (200) with an entrance pupil distance at least three times that of the effective focal length. The lens system is comprised of several conventional lenses and a diffractive optical element (DOE) for secondary chromatic aberration correction. In the illustrative embodiment, the system includes an entrance pupil (50), followed by a lens group (52) containing two refractive elements for primary color correction. Next along the optical axis is lens group (54), which contains two refractive elements for astigmatism and higher order coma correction, followed by lens group (60), which contains one refractive element (62) and one DOE (64) for secondary color correction.

24 Claims, 2 Drawing Sheets

EXTERNAL PUPIL LENS SYSTEM

BACKGROUND OF THE INVENTION

1. Field of the Invention

The present invention relates to optical systems. More specifically, the present invention relates to external pupil lens systems.

2. Description of the Related Art

Designing an external pupil imager in the visible spectral band is one of the most difficult tasks in lens design. The difficulty arises from the secondary chromatic aberration correction for the lateral and higher order aberrations such as spherochromatism and chromatic coma. Since the entrance pupil (aperture stop) is external to the optical system, any residual axial chromatic aberration and spherochromatism will introduce a significant amount of lateral chromatic aberration and chromatic coma. The difficulty in correcting the secondary chromatic aberration is due to the nonlinear property of the index of refraction of typical glass materials. Special glass materials such as KzSN4 and PSK52 can be used to minimize the secondary chromatic aberrations, but the lens curvatures will need to be very steep due to the inefficient nature of special glass material in primary chromatic aberration correction. Therefore, the lens tend to be very expensive and are difficult to fabricate and assemble.

The aberrations are more pronounced when the pupil is further away from the lens. This is due to the fact that the intersection of the chief ray on each lens surface is further away from the optical axis. Additionally, the angle of incidence of the chief ray on the lens surface is often very steep. The pupil distance (from the entrance pupil to the first lens) of a typical external pupil lens system is limited to about 0.7 of the effective focal length (EFL). Even with lenses constructed of special glass materials, the entrance pupil distance is still limited to about 1.5 times the EFL.

The entrance pupil distance is determined by the physical mechanics of the system containing the imager. For instance, sensor products for multiple spectral bands commonly have a front end reflective telescope followed by a beam splitting device. The beam splitting device directs different spectral radiation to the corresponding imaging optical systems. To minimize its size, the beam splitting device is located very closely to the telescope exit pupil. The location of this beam splitter dictates the location of the external pupil of the follow up imagers. Therefore, each imager is required to have an external pupil with the pupil distance exceeding 2 to 3 times that of the EFL.

A conventional external pupil lens is therefore a very complex optical system, consisting of many lenses of complex design, some of which are made of special glass materials which are expensive and difficult to fabricate, and having an entrance pupil distance limited to about 1.5 times the EFL.

Hence, a need exists in the art for an improved external pupil lens system with fewer lenses, no need for special glass materials, and a greater allowable entrance pupil distance.

SUMMARY OF THE INVENTION

The need in the art is addressed by the present invention, which provides a method for constructing an external pupil lens system with the entrance pupil distance at least three times that of the effective focal length (EFL). The lens system is comprised of several conventional lenses and a diffractive optical element (DOE) for secondary chromatic aberration correction. In the illustrative embodiment, the system includes an entrance pupil, followed by a first lens group containing two refractive elements for primary color correction. Next along the optical axis is a second lens group, which contains two refractive elements for astigmatism and higher order coma correction, followed by a third lens group, which contains one refractive element and one DOE for secondary color correction.

An optical system constructed in accordance with the present teachings is capable of achieving excellent performance even with a pupil distance more than three times the EFL. The number of lenses can be reduced by more than 40% in comparison with a conventional system. More importantly, there is no need to employ any special glass materials or aspheric lenses, which are very expensive and difficult to fabricate. Additionally, the optical power of each lens is much smaller than that of a conventional imager. Therefore, the optical system is less sensitive to alignment error.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
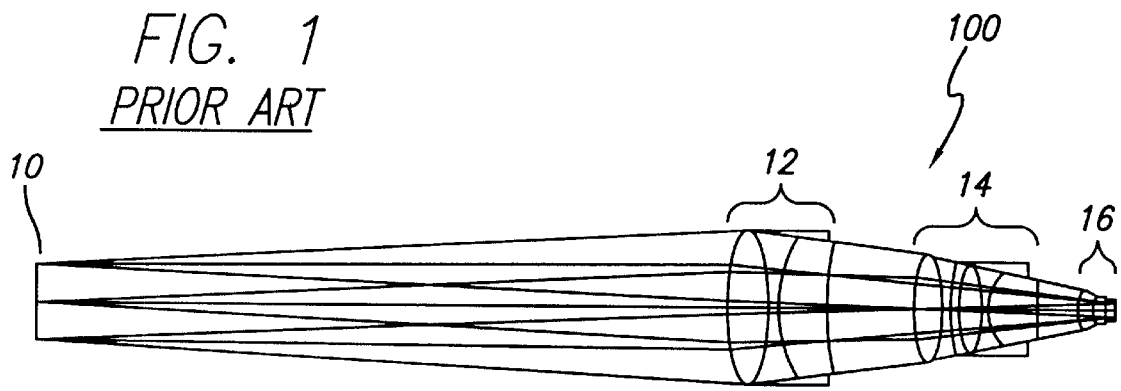
FIG. 1 is a diagram of an external pupil lens system of conventional design and construction.

FIG. 1 is a diagram of an external pupil lens system of conventional design and construction. The specifications for the system are an f-number of f/2.5, an effective focal length (EFL) of 2.33 inches, and a 6.0 degree field of view. The entrance pupil (also called the aperture stop, which determines the amount of light that traverses the optical system) is located external to the lens system, 7.5 inches in front of the first lens, which is more than three times the EFL. The system includes an entrance pupil 10, followed by a lens group 12 containing three refractive elements. Next along the optical axis is lens group 14 containing five refractive optical elements, followed by lens group 16 which contains two refractive elements. Ten optical elements are required in this glass-refractive assembly using conventional construction from the prior art. The lenses have very steep curvatures (high optical power), so the system will be very sensitive. In fabrication, any small misalignment error will degrade the image system significantly.

Figure 2:
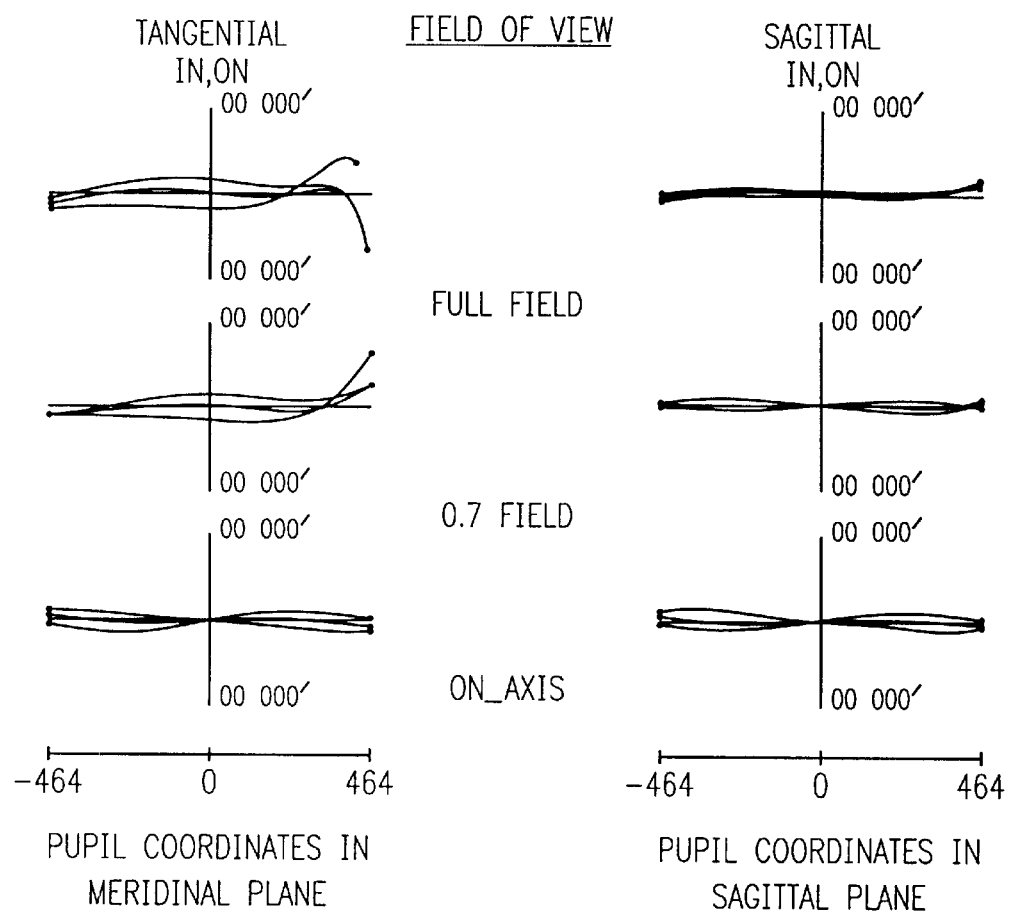
FIG. 2 shows the H-tan U curves associated with the conventional external pupil lens system described in FIG. 1.

FIG. 2 depicts the H-tan U optical performance curves associated with the lens system described in FIG. 1. These curves are commonly used by those skilled in the art to analyze optical designs. The top, middle, and bottom curves are the corresponding geometric aberration plots at the full field, 70% field, and on-axis, respectively. The corresponding tangential curves are on the left, and sagittal aberration curves are on the right.

The tangential aberration curves for the on-axis, 70% and full field in the top and middle left plots of FIG. 2 show that lateral chromatic aberration and chromatic coma are the limiting aberrations. Therefore, the numerical aperture and the pupil position-to-EFL ratio of a typical external pupil lens system have been limited to about f/4.0 and 0.7, respectively. To further increase the numerical aperture and the pupil distance, special glass materials such as FK54, CaF2, KzFSN4, and aspheric lenses can be used to minimize those aberrations. Unfortunately, the use of special glass materials and aspheric lenses significantly increases the cost associated with this design.

In accordance with the present teachings, the difficulties associated with the design of a conventional external pupil lens system are addressed by using diffractive optical elements (DOEs). Diffractive elements can take several physical forms, but generally function in accordance with the following grating equation:

$$\sin A = nL/d - \sin I \quad [1]$$

where A is the angle of diffraction, I is the angle of incidence, L is the wavelength, n is the order of diffraction, and d is the spacing of adjacent lines on the grating. The DOE used here is a very high diffraction efficiency Fresnel Kinoform zone plate with grating structure very similar to a Fresnel lens (Reference. L. B. Lesem, P. M, Hirsh, and J. A. Jordan, Jr., "The Kinoform: A New Wavefront Reconstruction Device," IBM J. Res. Dev., vol. 13, pp. 150–155, 1969).

The present invention uses a diffractive optical element in conjunction with several conventional refractive elements by suitably arranging and locating the elements relative to each other and appropriately distributing the optical power of the elements throughout the structure such that the chromatic aberrational contributions from each of the two types of optical elements are essentially canceled out.

Figure 3:
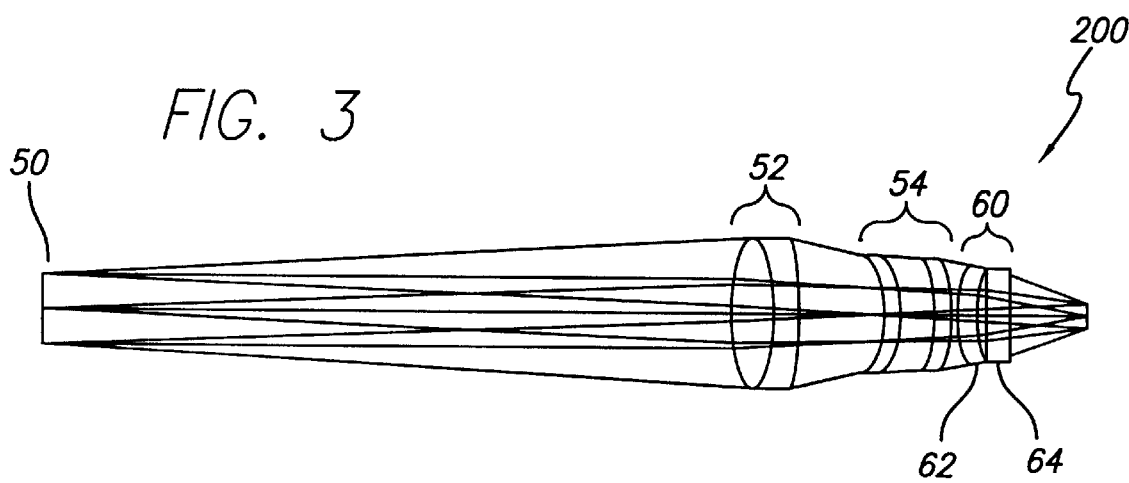
FIG. 3 is a diagram of an illustrative embodiment of an external pupil lens system with one DOE element designed in accordance with the teachings of the present invention.

FIG. 3 is a diagram of an external pupil lens system with the same specifications as the system of FIG. 1, designed in accordance with the teachings of the present invention. In the illustrative embodiment, the system includes an entrance pupil 50, followed by a lens group 52 containing two refractive elements for primary color correction. Next along the optical axis is lens group 54, which contains two refractive elements for astigmatism and higher order coma correction, followed by lens group 60, which contains one refractive element 62 and one DOE 64 for secondary color correction. The total number of lenses is reduced from 10 to 6. If the DOE is placed on one of the conventional lenses, the total number of lenses can be further reduced to 5 elements.

Those skilled in the art will appreciate that the location of the first lens group 52 and the third lens group 60 can be exchanged, with the first group 52 in the back end, and the DOE group 60 in the front end, without departing from the scope of the present teachings.

Chromatic aberrations include primary axial color, primary lateral color, secondary axial color, and secondary lateral color. With primary correction, proper correction is achieved at only two specific design wavelengths within the operating spectral interval. With secondary correction, proper correction is achieved at three specific design wavelengths. Aberrations for primary axial color and primary lateral color are usually corrected through the use of either cemented or air-spaced achromats.

In the illustrative embodiment, primary chromatic aberration is corrected mainly by the first lens group 52 and the last lens group 60. The first lens group 52 which is a cemented or air-spaced doublet. The doublet consists of two lenses: a double convex lens having positive optical power made of low dispersive crown glass, and a concave convex lens having negative optical power made of high dispersive flint glass. Because the doublet is comprised of only two materials, it can only correct for two wavelengths (primary color correction).

The secondary chromatic aberration of the first lens group is corrected by the last lens group 60, which includes two lenses: a convex concave lens having positive optical power made of low dispersive crown glass 62 and the DOE 64. Higher order residual chromatic aberrations generated by the lens groups 52 and 54 (such as spherochromatism and chromatic coma) can also be compensated by the DOE 64. This lens group also needs to be reasonably well corrected in primary color aberration. When used in conjunction with the doublet 52, a third design wavelength can be corrected (secondary color correction). To more efficiently utilize the DOE for chromatic aberration correction, the DOE is purposely disposed in the rear end of the lens system such that the chief ray intersects the DOE further away from the optical axis.

The second lens group 54 contains two concave convex lenses used to correct for astigmatism and $5^{th}$ order coma.

Figure 4:
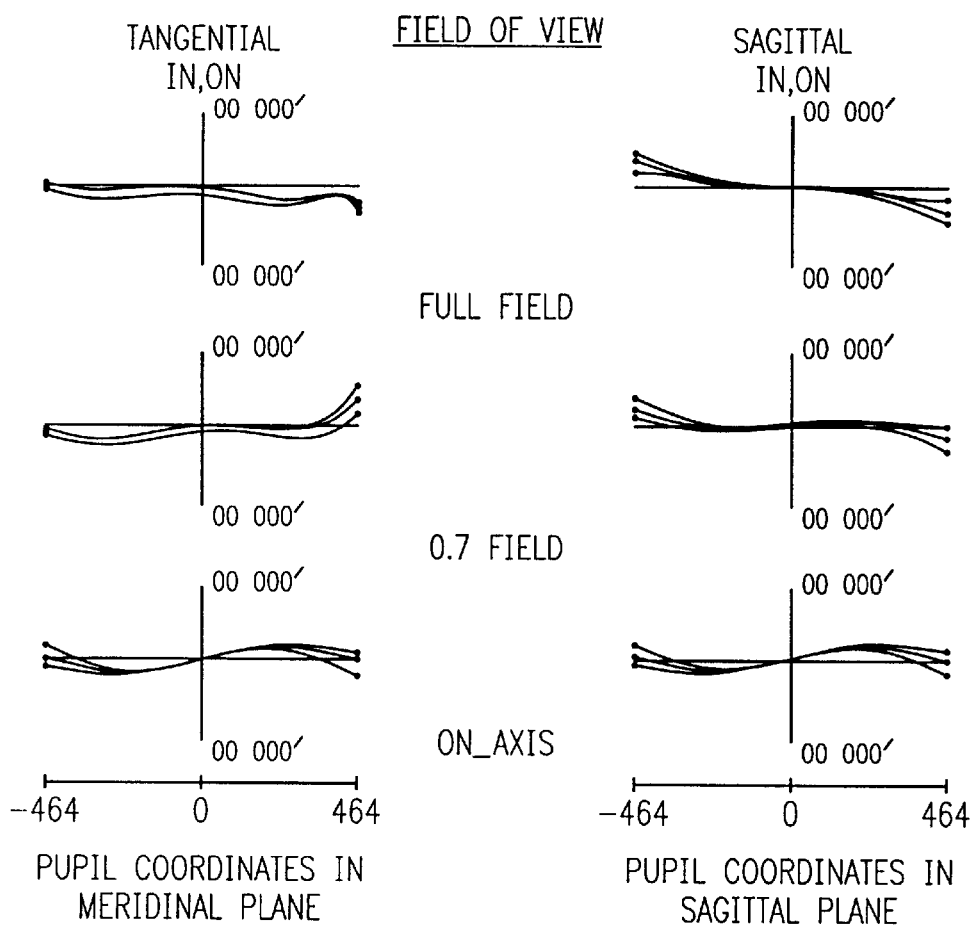
FIG. 4 shows the H-tan U curves associated with the illustrated external pupil lens system described in FIG. 3.

FIG. 4 depicts the H-tan U optical performance curves associated with the lens system described in FIG. 3. The top, middle, and bottom curves are the corresponding geometric aberration plots at the full field, 70% field, and on-axis, respectively. The corresponding tangential curves are on the left, and sagittal aberration curves are on the right. These curves demonstrate that the DOE is a very effective optical element in secondary chromatic aberration correction.

An optical system constructed in accordance with the present teachings is capable of achieving excellent performance even with a pupil distance more than three times the EFL. As shown in FIG. 3, the number of lenses can be reduced by more than 40%. More importantly, there is no need to employ any special glass materials or aspheric lenses, which are very expensive and difficult to fabricate. Additionally, the optical power of each lens is much smaller than that of a conventional imager. Therefore, the optical system is less sensitive to alignment error.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An optical lens system comprising:
   first means for providing primary chromatic aberration correction with respect to said image and
   second means for providing secondary chromatic aberration correction with respect to said image, wherein said second means includes a diffractive optical element;
   whereby an image forming entrance pupil is provided external to said lens system and said external pupil is located at least three times the effective focal length away from a vertex of a first lens in said first means along an axis from the external pupil.

2. The invention of claim 1 wherein said first means includes a doublet.

3. The invention of claim 2 wherein said doublet includes a positive optical power lens and a negative optical power lens.

4. The invention of claim 3 wherein said positive optical power lens is made of low dispersive crown glass.

5. The invention of claim 3 wherein said negative optical power lens is made of high dispersive flint glass.

6. The invention of claim 1 wherein said second means further includes a refractive lens.

7. The invention of claim 6 wherein said refractive lens has positive optical power.

8. The invention of claim 6 wherein said refractive lens is made of low dispersive crown glass.

9. The invention of claim 1 wherein said second means is disposed between said first means and the image plane.

10. The invention of claim 1 wherein said first means is disposed between said second means and the image plane.

11. The invention of claim 1 wherein said optical system further includes third means for astigmatism and higher order coma correction.

12. The invention of claim 11 wherein said third means includes at least one meniscus lens which is concave toward the pupil.

13. The invention of claim 11 wherein said third means is disposed between said first means and the image plane.

14. An optical lens system that forms an image comprising:

an entrance pupil located external to said lens system;

a first lens group for providing primary chromatic aberration correction with respect to said image;

a second lens group in optical alignment with said first lens group; and a third lens group in optical alignment with said second lens group for providing secondary chromatic aberration correction with respect to said image, said third lens group including a diffractive optical element.

15. A method for designing an external pupil optical lens system that forms an image including the steps of:

correcting primary chromatic aberration with respect to said image by using a first lens group; and correcting secondary chromatic aberration with respect to said image by using a second lens group, wherein said second lens group includes a diffractive optical element, whereby an image forming entrance pupil is provided external to said lens system and said external pupil is located at least three times the effective focal length away from a vertex of a first lens in said system.

16. An optical lens system comprising:

first means for providing primary chromatic aberration correction with respect to said image and second means for providing secondary chromatic aberration correction with respect to said image, wherein said second means includes a diffractive optical element;

whereby with an image forming entrance pupil is provided external to said lens system and said first means is disposed between said second means and the image plane.

17. An optical lens system comprising:

first means for providing primary chromatic aberration correction with respect to said image and second means for providing secondary chromatic aberration correction with respect to said image, wherein said second means includes a diffractive optical element; and third means for astigmatism and higher order coma correction of said image, whereby with an image forming entrance pupil is provided external to said lens system.

18. The invention of claim 17 wherein said third means includes at least one meniscus lens which is concave toward the pupil.

19. The invention of claim 17 wherein said third means is disposed between said first means and the image plane.

20. An optical lens system that forms an image comprising:

an entrance pupil located external to said lens system;

a first lens group for providing primary chromatic aberration correction with respect to said image, said first lens group including a diffractive optical element;

a second lens group in optical alignment with said first lens group; and a third lens group in optical alignment with said second lens group for providing secondary chromatic aberration correction with respect to said image.

21. The invention of claim 14 wherein said second lens group corrects for astigmatism in said image.

22. The invention of claim 21 wherein said second lens group provides higher order coma correction in said image.

23. The invention of claim 20 wherein said second lens group corrects for astigmatism in said image.

24. The invention of claim 23 wherein said second lens group provides higher order coma correction in said image.

* * * * *

UNITED STATES PATENT AND TRADEMARK OFFICE
CERTIFICATE OF CORRECTION

PATENT NO.    : 6,563,654 B2
DATED         : May 13, 2003
INVENTOR(S)   : Chungte W. Chen et al.

It is certified that error appears in the above-identified patent and that said Letters Patent is hereby corrected as shown below:

Column 1,
Line 2, please insert -- This invention was made with Government support under Contract No. DAAB07-96-3-J-0016 awarded by the Department of the Army. The Government has certain rights in this invention. --.

Signed and Sealed this

Fourteenth Day of October, 2003

JAMES E. ROGAN
*Director of the United States Patent and Trademark Office*